March 6, 1962 MASUKICHI KONDO 3,023,709
VANES OF AN IMPELLER FOR AXIAL FLOW PROPELLER PUMPS
Filed May 26, 1958

MASUKICHI KONDO  INVENTOR.

BY Wenderoth, Lind & Ponack
ATTYS.

3,023,709
VANES OF AN IMPELLER FOR AXIAL FLOW PROPELLER PUMPS

Masukichi Kondo, 170—6 Kanno-cho,
Nishinomiya, Hyogoken, Japan
Filed May 26, 1958, Ser. No. 737,928
2 Claims. (Cl. 103—89)

This invention relates to a novel type of vanes of an impeller for axial flow propeller pumps. The axially projected contour of a vane for an axial flow propeller pump is conventionally dovetail in form, its front and trailing edges making nearly radial lines, and the ratio of radii at the tip and the root being about 2:1.

As the speed of water in an axial direction must be the same at every point on a radius, the angle of a vane is so designed that it gradually increases from the tip to the root. The theoretical head of an axial flow propeller pump can be calculated from the following formula, according to the momentum theory, when the ratio of radii of the tip and the root is 2:1.

$$H = \frac{1}{g} U(V_2 \cos \alpha_2 - V_1 \cos \alpha_1)$$

where H is theoretical head to be obtained,

U is a circumferential speed of a point on a radius of a vane, $V_1$ and $V_2$ are absolute speeds of water at the entrance and the exit of a vane, respectively, and $\alpha_1$ and $\alpha_2$ are angles between the directions of $V_1$ and $V_2$ and the circumferential direction, respectively.

When there are no guide vanes at the entrance of water, $\cos \alpha_1$ is nearly zero, therefore the above equation becomes $$H = \frac{1}{g} UV_2 \cos \alpha_2$$

If the shape and angle of a vane are similar on every circumferential section, the velocity of water at the root is ½ of that at the tip, as the circumferential speed U of the root is ½ of that of the tip. Therefore the heads at the tip and the root are the same as the ratio of their UV, that is 4:1.

In order to balance the heads at the tip and the root, the angles of vane at the tip and the root are required to be selected so as to make the value $V_2 \cos \alpha_2$ at the root as large as twice that at the tip, so that the ratio $V_2 \cos \alpha_2/U$ at the tip and the root becomes 1:4. This modified form of a vane, however, increases essential defects of an axial flow propeller pump as described hereinafter.

The inventor has devised a novel shape of a vane without increasing the value $V_2 \cos \alpha_2/U$ very much at the root, whereby the head at the tip and the root are balanced. The invention will be further described referring to the accompanying drawing, in which FIGURE 1 is an axially projected view of a conventional impeller for an axial flow propeller pump;

Figure 1:
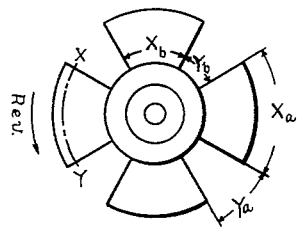
Figures 5, 6:
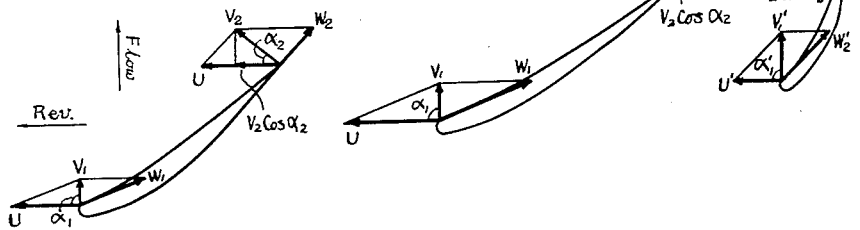

FIGURE 5 in a section of a vane taken on a cylindrical surface X—Y of FIGURE 1 and vector diagrams of water speed at the front and trailing edges; and FIGURE 6 shows similar views at the tip and the root of a vane according to the present invention.

Figure 2:
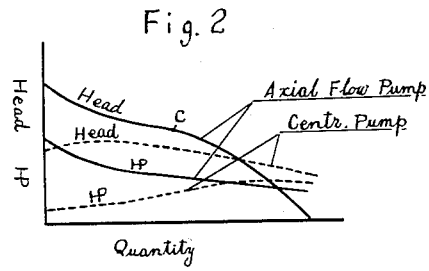
FIGURE 2 is a diagram showing the relation between head, shaft horse power and quantity of water of an axial flow propeller pump and of a centrifugal pump, for purposes of comparison.

In an ordinary centrifugal pump, shaft horsepower is decreased when the quantity of water decreased (FIGURE 2). However, in an axial flow propeller pump, shaft horsepower increases when a delivery valve is closed to decrease the quantity of water. This is because in an axial flow propeller pump centrifugal force radially presses the water which is axially flowing through the spaces between the vanes. When a delivery valve is closed, the quantity of water decreases and the velocity of water also decreases. If the delivery valve is closed further until the quantity of water decreases beyond the "point of inflexion," which separates a concave from a convex portion of a water quantity curve, the stream line flow of the water changes its form from that of the upper part to that of the lower part in FIGURE 3, and a large loss of energy is caused.

Increase of shaft-horsepower when the quantity of water is decreased by closing a delivery valve, is an essential defect of an axial flow propeller pump. To improve this disadvantage, the ratio of speed of water passing between the vanes $V \cos \alpha$ to the circumferential speed U at the tip, is required to be kept small. But insofar as the ratio of speeds $V \cos \alpha/U$ at the tip and the root is 1:4, it is unavoidable that the speed at the root becomes too large even if the speed at the tip is kept small. This disadvantage cannot be avoided so far as a dovetail shaped vane is employed.

The relations between U, W, and V, when $\cos \alpha_1 = 0$ are illustrated in FIGURE 5. As before described, the theoretical head at the tip is, $$H_2 = \frac{1}{g} UV_2 \cos \alpha_2 \qquad (1)$$

and the theoretical head obtained at the root is $$H' = \frac{1}{g} U'V_2' \cos \alpha_2' \qquad (2)$$

Where H', U', V' and $\alpha'$ are values for the root corresponding to H, U, V and $\alpha$ for the tip.

When the ratio of radii of the tip and the root is 2:1, U' is U/2. Therefore, $$H' = \frac{1}{2g} UV_2 \cos \alpha_2' \qquad (3)$$

If the shape and angle of the tip and the root are similar, the water speed diagram is also similar, and as $$\frac{V'}{2} = \frac{V_2}{2}$$

and $\alpha_2' = \alpha$ the Equation 3 can be expressed $$H' = \frac{1}{4g} UV_2 \cos \alpha_2 \qquad (4)$$

This means that if shape and angle of the tip and root are similar, the head at the root is ¼ of that at the tip.

FIGURE 6 shows sections of the tip and root of a vane complying with the requirements in the Formula 4. As it is seen in the Figure, the angle of vane is too sharp, the width is too large and the relative speed of flow is too large at the tip, while the angle of the vane is too large at the root. If the angle of the vane is 90°, it merely agitates water and no head is obtained, the efficiency being zero. It must not be over 30° at the root, too. For this reason, it is impossible to satisfy the formula 4 taking the speeds in axial direction to be the same at the tip and the root.

Figure 3:
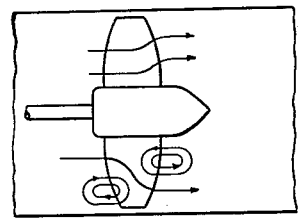
FIGURE 3 illustrates stream lines passing through the space between vanes, the upper ones being those for normal operation, and the lower ones being those when a delivery valve is substantially completely closed.

In order to moderate the above mentioned disadvantage, and to avoid interference of the vanes, the angle of the vane is generally decreased at the root, so that conventional vanes are made in a dovetail form in an axially projected view. Due to this unreasonable shape of vanes, production of counter flow circulation as illustrated in the lower part of FIGURE 3, is encouraged.

It is considered that the abovementioned disadvantage can be overcome by increasing the width of a vane at the root as measured on an axially projected shape. But, if the width of the root is increased in the forward direction of rotation, energy is received at the root earlier than the tip, so that production of counter flow circulation is encouraged. For this reason, the increase of width of the root should be made in the rearward direction.

Figure 4:
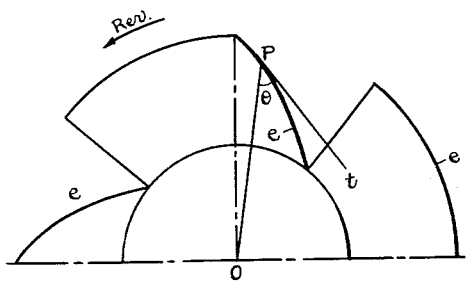
FIGURE 4 is an axially projected view of an impeller having vanes according to this invention.

Assuming that the coefficient of head increases at the tip and the root is the same, it is required that the ratio of the width $X_a$ at the tip to the width $X_b$ at the root (FIGURE 1) must be 2 in order to make the heads at the tip and the root the same. However, overlap of vanes in an axially projected view must be avoided, and therefore it is impossible to make the ratio $X_a/X_b$ as large as 2, but is limited to 1.0 to 1.3. When this ratio is taken as 1.0 to 1.3, and overlapping of adjacent vanes at the root is avoided, the trailing edge $e$ (FIGURE 4) of the vane, which is increased according to this invention, makes a convex curve such that the angle $\theta$ between a radial line from the center O of the impeller to any point P on the curve $e$ and a tangent $t$ at the point is 40° or thereabout. When this angle is less than 20°, the increase of the trailing edge is too small to obtain a satisfactory result.

The following results have been obtained by experiments with pumps which employ an impeller with vanes according to this invention.

(1) The efficiency of the pumps is increased from 5 to 6%.

(2) The ratio $Qc/Qn$ of conventional pumps with dovetail vanes is generally 60 to 80%, while that of pumps with the modified vanes is 46 to 50%. Where $Qn$ is the quantity of water pumped at the highest efficiency and $Qc$ is that pumped at the inflexion point of the curve, that is the point C in FIGURE 2. This proves that the tendency to produce counter flow circulation has been reduced.

(3) The ratio of shaft horsepower when the quantity of water pumped is zero to that at the highest efficiency is called "Lift coefficient." For dovetail vanes, this coefficient is some times over 200%, and 170 to 190% is considered to be a favorable value, while that of this novel vane is about 160%.

(4) The ratio $Y/Yn$ shows the roundness of an efficiency curve, where $Yn$ is the highest efficiency and $Y$ is the efficiency when the quantity of water is one-half of that at the highest efficiency. This ratio for a dovetail vane is generally 60 to 64%, but that of the novel vane is 66 to 71%. There is no record, so far as the inventor is aware, that this ratio is over 68%.

What I claim is:

1. In an axial flow liquid pump, that improvement comprising a hydraulic impeller including a vane having concentric cylindrical inner and outer peripheries and having a width at the tip thereof, as measured on an axial end projection of the impeller, from 1.0 to 1.3 times the width of the root of the vane, and the trailing edge of said vane being substantially uniformly convexly curved with a curvature such that the acute angle between a radial line through any point on the trailing edge and a tangent to the trailing edge at the point is greater than 20°.

2. The improvement as claimed in claim 1 in which the trailing edge has a curvature such that said acute angle is 40°.

References Cited in the file of this patent

UNITED STATES PATENTS

| | | |
|---|---|---|
| 921,896 | Schlotter | May 18, 1909 |
| 1,062,258 | Schlotter | May 20, 1913 |
| 1,596,459 | Schmidt | Aug. 17, 1926 |
| 1,688,809 | Gill | Oct. 23, 1928 |
| 1,970,435 | Sharp | Aug. 14, 1934 |
| 2,029,813 | De Mey | Feb. 4, 1936 |
| 2,225,406 | Anderson | Dec. 17, 1940 |
| 2,269,287 | Roberts | Jan. 6, 1942 |
| 2,325,154 | Walters | July 27, 1943 |
| 2,327,841 | Hagen | Aug. 24, 1943 |
| 2,390,879 | Hagen | Dec. 11, 1945 |
| 2,847,941 | Jackson | Aug. 19, 1958 |

FOREIGN PATENTS

| | | |
|---|---|---|
| 128,604 | Australia | Aug. 2, 1948 |
| 516,440 | Canada | Sept. 13, 1955 |